United States Patent [19]

Chiba et al.

[11] 4,429,885
[45] Feb. 7, 1984

[54] SPACER AND EXPANDER MEMBER FOR HOLDING AND BIASING PISTON RING RAILS

[75] Inventors: Ko Chiba; Hajime Yamauchi; Yoneo Kawauchi; Yukio Ikeda, all of Kashiwazaki, Japan

[73] Assignee: Kabushiki Kaisha Riken, Tokyo, Japan

[21] Appl. No.: 439,177

[22] Filed: Nov. 4, 1982

[51] Int. Cl.³ .............................. F16J 9/06; F16J 9/20
[52] U.S. Cl. ........................................ 277/140; 277/141; 277/216; 267/1.5
[58] Field of Search ............................ 277/138–142, 277/148, 216; 267/1.5

[56] References Cited

U.S. PATENT DOCUMENTS

| 2,831,738 | 4/1958 | Marien . | |
| 3,477,732 | 11/1969 | Warrick | 267/1.5 X |
| 3,606,354 | 9/1971 | Prasse et al. | 277/140 |
| 3,762,728 | 10/1973 | Prasse et al. | 277/141 X |
| 3,998,572 | 12/1976 | Warrick | 277/141 X |

*Primary Examiner*—Robert S. Ward
*Attorney, Agent, or Firm*—Finnegan, Henderson, Farabow, Garrett & Dunner

[57] ABSTRACT

A piston ring assembly including a pair of rails engageable with a cylinder wall and a spacer and expander member for holding and expanding the rails. The spacer and expander member has a corrugated base and arms extending alternately upwardly and downwardly from lower and upper crowns of the corrugated base, which arms are inclined radially outwardly to provide an improved resilient spring-like action to the rails supported on the crowns.

3 Claims, 3 Drawing Figures

SPACER AND EXPANDER MEMBER FOR HOLDING AND BIASING PISTON RING RAILS

BACKGROUND OF THE INVENTION

This invention relates to piston ring assemblies for pistons of internal combustion engines, more particularly to piston ring assemblies each having a pair of rails engageable with a cylinder wall and a spacer and expander member for holding the rails in axially spaced relation and for expanding the rails radially outwardly.

Pistons of internal combustion engines are equipped with several types of piston rings to prevent leakage of combustion gas and consumption of oil. One of the piston rings comprises a pair of rails engageable with a cylinder wall and a spacer and expander member for holding and expanding the rails.

The typical piston ring assembly is disclosed in U.S. Pat. No. 2,831,738 in which FIGS. 23 to 27 show the piston ring assembly having arms extending alternately upwardly and downwardly from lower and upper crowns of the corrugated spacer and expander member thereof. The rails supported on the crowns are urged radially outwardly due to self-expansion force of the spacer and expander member and engage the cylinder wall under springable compression when mounted in a groove of the piston and compressed. The arms abutting the inner peripheries of the rails assist in offering the rails the resilient spring-like action to exert the outward radial load thereon. It is noted that the conventional arms extend vertically only. However, it has been found that arms so formed do not provide the proper outward radial load on the rails to obtain high overall conformability of the rails to the cylinder wall.

SUMMARY OF THE INVENTION

It is therefore an object of the present invention to provide a piston ring assembly having improved arms to increase the spring-like action thereof.

Another object of the present invention is to provide a piston ring assembly including a spacer and expander member having radially outwardly inclined arms which extend alternately upwardly and downwardly from lower and upper crowns of the member.

According to the present invention, the above and other objects can be accomplished by a piston ring assembly comprising a pair of rails having cylinder-engaging rounded faces and a spacer and expander member for holding said rails in axially spaced relation and for expanding said rails radially outwardly, said spacer and expander member constructed of corrugated sheet metal and having upper and lower crowns and connecting portions for continuously connecting said crowns, each said upper crown being provided at its inner portion with an arm extending downwardly to engage the inner periphery of said rail supported on said lower crown, each said lower crown being provided at its inner portion with an arm extending upwardly to engage the inner periphery of said rail supported on said upper crown, said arms extending alternately upwardly and downwardly from said lower and upper crowns and being inclined radially outwardly to provide a resilient spring-like action, and the rail receiving portions of said arms being inclined radially inwardly.

In a preferable aspect of the present invention, the upper and lower crowns have upwardly and downwardly raised portions at its outer peripheries, respectively to come into contact with the side surfaces of the rails when mounted. Preferably, the inclination of the arms is 5° to 40°. The arms are tapered in width and each is provided at its tip with a rail receiving portion which is enlarged.

BRIEF DESCRIPTION OF THE DRAWINGS

The above and other objects and features of the present invention will become apparent from the following descriptions of preferred embodiments with reference to the accompanying drawings, in which.

DETAILED DESCRIPTION

Figure 1:
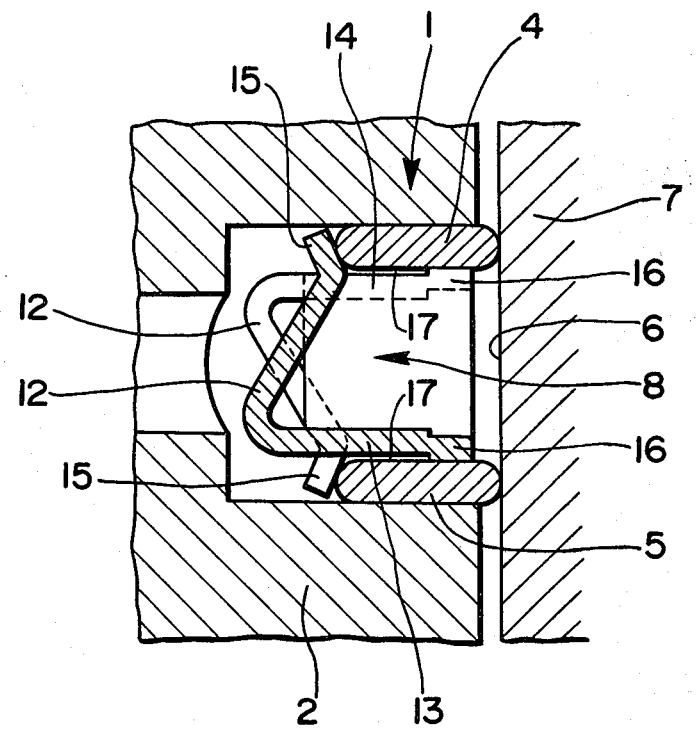
FIG. 1 is a cross-sectional view of one embodiment of a piston ring assembly according to the present invention.

Referring to FIG. 1, a piston ring assembly 1 for a piston 2 of an internal combustion engine, which is usefull as an oil ring, includes a pair of rails 4, 5 engageable with an inner wall 6 of a cylinder 7 and a spacer and expander member 8 for holding the rails 4, 5 in axially spaced relation and for expanding the rails 4, 5 radially outwardly. Both end faces of the rails 4, 5 are rounded and at least the outer rounded end faces thereof may be covered with a layer of chromiun or other wear resisting material.

Figure 2:
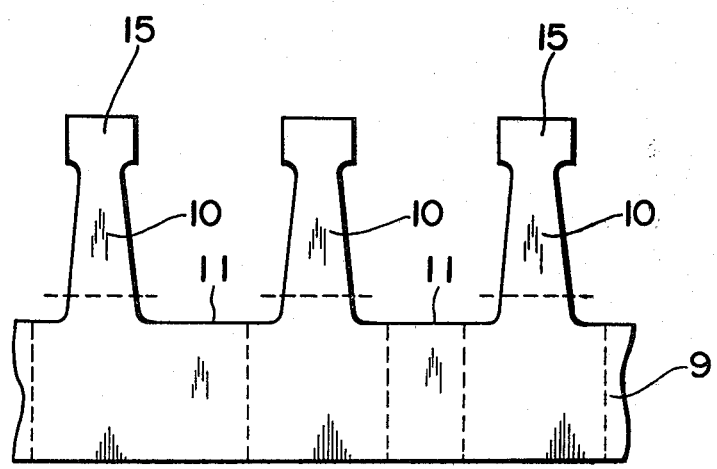
FIG. 2 is a plan view of a strip of metal sheet from with a spacer and expander member is formed.
Figure 3:
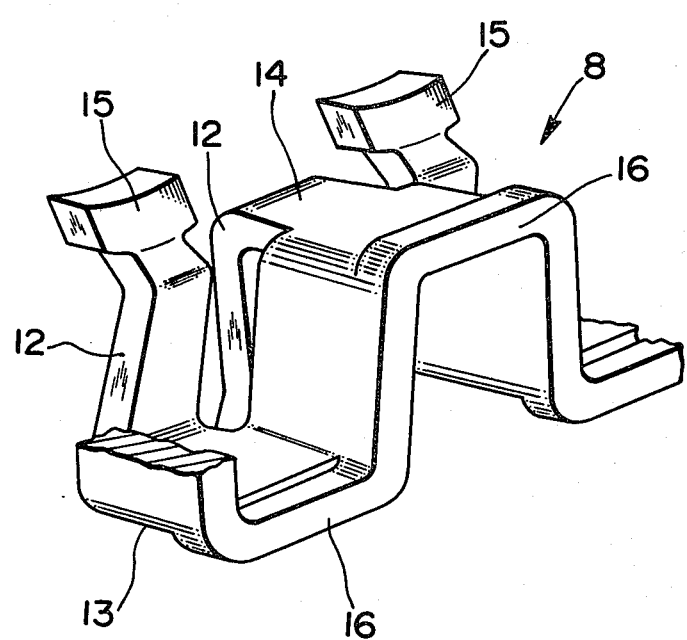
FIG. 3 is a fragmentary perspective view of the spacer and expander member of FIG. 1 and formed from the metal strip of FIG. 2.

FIG. 2 illustrates a strip of spring metal having a body 9 and legs 10 projecting from one edge 11 thereof at spaced intervals. The body 9 of the spring metal is bent along dotted lines in the corrugation and annular shape to form upper and lower crowns and at the same time the legs 10 are also bent along the dotted lines to form arms 12 which extended alternately upwardly and downwardly from the lower and upper crowns 13, 14. See FIG. 3. It should be noted that the dotted lines on the legs 10 are somewhat spaced apart from the edge 11 of the body 9 so that the bent portions of the arms 12 are independent of the stiffness of the corrugated body and are resillient and spring-like.

As is apparent from FIG. 2, the legs 10 are tapered in width and each is provided at its tip end with an enlarged portion 15 to engage the inner end faces of the rails 4,5.

The most important thing when bending the legs 10 of the body 9 is that they are bent along the dotted lines in such a manner that the legs 10 are inclined radially outwardly to the extent that the top portions thereof are placed in spaces between adjacent crowns. Preferably, the inclination of each leg is 5° to 40°. The rail receiving portions 15 are inclined radially inwardly and extend beyond the crowns 13, 14.

When corrugating the body 9 of the spring metal, it is important that each crown is provided at its outer peripheral portion with a raised portion 16, which comes into direct contact with the side surface 17 of the rail at the outer periphery thereof when the rail is mounted on each crown. See FIG. 3. The raised portion 16 is useful to maintain the rail in a desired attitude and provides conformability of the rail to the cylinder wall 6. The configurations of the inclined arms and the corrugated body will be easily understood from FIG. 3.

In the preferable mode of the present invention, the rail receiving portions 15 are convexed as viewed from an outward direction.

As apparent from the above embodiment, the piston ring assembly according to the present invention has improved arms which are inclined radially outwardly so that the resilient spring-like action of each arm is increased and the conformability of the rail abutting the arms is enhanced.

The invention has thus been shown and described with reference to specific embodiments, however, it should be noted that the invention is in no way limited to the details of the illustrated structure but changes and modifications may be made without departing from the scope of the appended claims.

We claim:

1. A piston ring assembly comprising a pair of rails having cylinder-engaging rounded faces and a spacer and expander member for holding said rails in axially spaced relation and for expanding said rails radially outwardly, said spacer and expander member being constructed of corrugated sheet metal having upper and lower crowns and connecting portions continuously connecting said crowns, each said upper crown being provided at its inner portion with an arm extending downwardly to engage the inner periphery of said rail supported on said lower crown, each said lower crown being provided at its inner portion with an arm extending upwardly to engage the inner periphery of said rail supported on said upper crown, each said arm being tapered in width and provided at its tip with an enlarged rail receiving portion, said arms extending alterntely upwardly and downwardly from said lower and upper crowns and being inclined radially outwardly to provide a resilient spring-like action, the rail receiving portions of said arms being inclined radially inwardly.

2. A piston ring assembly according to claim 1, in which said upper and lower crowns have upwardly and downwardly raised portions and their outer peripheries, respectively, to engage the side surfaces of said rails at the outer periphery thereof.

3. A piston ring assembly according to claim 2, in which the inclination of each said arm is 5° to 40°.

* * * * *

REEXAMINATION CERTIFICATE (603rd)
United States Patent [19]
Chiba et al.

[11] B1 4,429,885
[45] Certificate Issued Dec. 23, 1986

[54] SPACER AND EXPANDER MEMBER FOR HOLDING AND BIASING PISTON RING RAILS

[75] Inventors: Ko Chiba; Hajime Yamauchi; Yoneo Kawauchi; Yukio Ikeda, all of Kashiwazaki, Japan

[73] Assignee: Kabushiki Kaisha Riken, Tokyo, Japan

Reexamination Request:
No. 90/000,871, Oct. 2, 1985

Reexamination Certificate for:
Patent No.: 4,429,885
Issued: Feb. 7, 1984
Appl. No.: 439,177
Filed: Nov. 4, 1982

[51] Int. Cl.4 .............................. F16J 9/06; F16J 9/20
[52] U.S. Cl. ................... 277/140; 277/141; 277/216; 267/1.5
[58] Field of Search .................. 277/138–142, 277/148, 216; 267/1.5

[56] References Cited
U.S. PATENT DOCUMENTS

| | | |
|---|---|---|
| 2,831,738 | 4/1958 | Marien . |
| 3,172,672 | 3/1965 | Marien . |
| 3,261,612 | 7/1966 | Games . |
| 3,477,732 | 11/1969 | Warrick . |
| 3,485,504 | 12/1969 | Wells . |
| 3,606,354 | 9/1971 | Prasse et al. . |
| 3,738,668 | 6/1973 | Minegishi . |
| 3,762,728 | 10/1973 | Prasse et al. . |
| 3,998,572 | 12/1976 | Warrick . |

*Primary Examiner*—Robert S. Ward

[57] ABSTRACT

A piston ring assembly including a pair of rails engageable with a cylinder wall and a spacer and expander member for holding and expanding the rails. The spacer and expander member has a corrugated base and arms extending alternately upwardly and downwardly from lower and upper crowns of the corrugated base, which arms are inclined radially outwardly to provide an improved resilient spring-like action to the rails supported on the crowns.

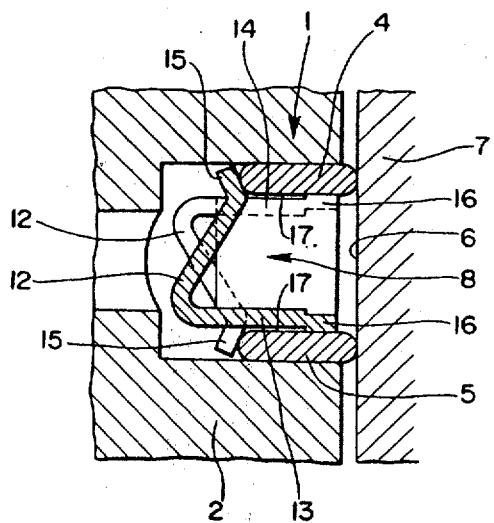

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 2, lines 46–49:

As is apparent from FIG. 2, the legs 10 [are tapered in width] *that are bent to form arms 12 taper inwardly in width toward their tip end* and each is provided at its tip end with an enlarged portion 15 to engage the inner end faces of the rails 4,5.

AS A RESULT OF REEXAMINATION, IT HAS BEEN DETERMINED THAT:

Claim 1 is determined to be patentable as amended.

Claims 2 and 3, dependent on an amended claim, are determined to be patentable.

1. A piston ring assembly comprising a pair of rails having cylinder-engaging rounded faces and a spacer and expander member for holding said rails in axially spaced relation and for expanding said rails radially outwardly, said spacer and expander member being constructed of corrugated sheet metal having upper and lower crowns and connecting portions continuously connecting said crowns, each said upper crown being provided at its inner portion with an arm extending downwardly to engage the inner periphery of said rail supported on said lower crown, each said lower crown being provided at its inner portion with an arm extending upwardly to engage the inner periphery of said rail supported on said upper crown, each said arm [being tapered in width] *tapering inwardly in width toward its tip* and provided at its tip with an enlarged rail receiving portion, said arms extending alternately upwardly and downwardly from said lower and upper crowns and being inclined radially outwardly to provide a resilient spring-like action, the rail receiving portions of said arms being inclined radially inwardly.

* * * * *